(12) United States Patent
Hashimoto et al.

(10) Patent No.: US 10,720,869 B2
(45) Date of Patent: Jul. 21, 2020

(54) MOTOR CONTROL DEVICE

(71) Applicant: FANUC CORPORATION, Minamitsuru-gun, Yamanashi (JP)

(72) Inventors: Shoutarou Hashimoto, Yamanashi (JP); Yuuki Morita, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/153,004

(22) Filed: Oct. 5, 2018

(65) Prior Publication Data
US 2019/0123670 A1 Apr. 25, 2019

(30) Foreign Application Priority Data
Oct. 19, 2017 (JP) .................. 2017-202804

(51) Int. Cl.
| | | |
|---|---|---|
| H02P 21/22 | (2016.01) | |
| H02P 21/08 | (2016.01) | |
| H02P 23/00 | (2016.01) | |
| H02P 21/18 | (2016.01) | |
| G05B 19/416 | (2006.01) | |

(Continued)

(52) U.S. Cl.
CPC ............ *H02P 21/22* (2016.02); *G05B 19/416* (2013.01); *H02P 21/08* (2013.01); *H02P 21/141* (2013.01); *H02P 21/18* (2016.02); *H02P 23/0086* (2013.01); *G05B 2219/41319* (2013.01); *H02P 27/06* (2013.01)

(58) Field of Classification Search
CPC ...... H02P 21/22; H02P 27/22; H02P 23/0086; G05B 19/416
See application file for complete search history.

(56) References Cited

U.S. PATENT DOCUMENTS

2008/0303476 A1* 12/2008 Iwashita ............. H02P 21/0003
                                                                318/766
2017/0063261 A1* 3/2017 Tsutsumi ................ H02P 23/12

FOREIGN PATENT DOCUMENTS

| CN | 101320955 | 12/2008 |
|---|---|---|
| CN | 106487298 | 3/2017 |
| JP | 2008-306798 | 12/2008 |

(Continued)

OTHER PUBLICATIONS

Office Action dated Jan. 22, 2020 in CN Patent Application No. 201811209652.0.

*Primary Examiner* — Eduardo Colon Santana
*Assistant Examiner* — Said Bouziane
(74) *Attorney, Agent, or Firm* — Wenderoth, Lind & Ponack, L.L.P.

(57) ABSTRACT

A motor control device controls an induction motor driving a spindle of a machine tool, and includes: a spindle control unit that controls a rotational position or rotational speed of the spindle, and a secondary magnetic flux of the induction motor in accordance with an operation command based on an operation program of the machine tool; an advance detection unit that pre-reads the operation program, and detects a change in the operation command requiring to increase the secondary magnetic flux of the induction motor in advance; and an advance change unit that causes the secondary magnetic flux of the induction motor to increase prior to a change in the operation command in the spindle control unit, in a case of a change in the operation command being detected by the advance detection unit.

4 Claims, 13 Drawing Sheets

(51) Int. Cl.
*H02P 21/14* (2016.01)
*H02P 27/06* (2006.01)

(56) References Cited

FOREIGN PATENT DOCUMENTS

| | | |
|---|---|---|
| JP | 2012-44835 | 3/2012 |
| JP | 2013-223329 | 10/2013 |
| JP | 2014-48761 | 3/2014 |
| JP | 2017-46487 | 3/2017 |

\* cited by examiner

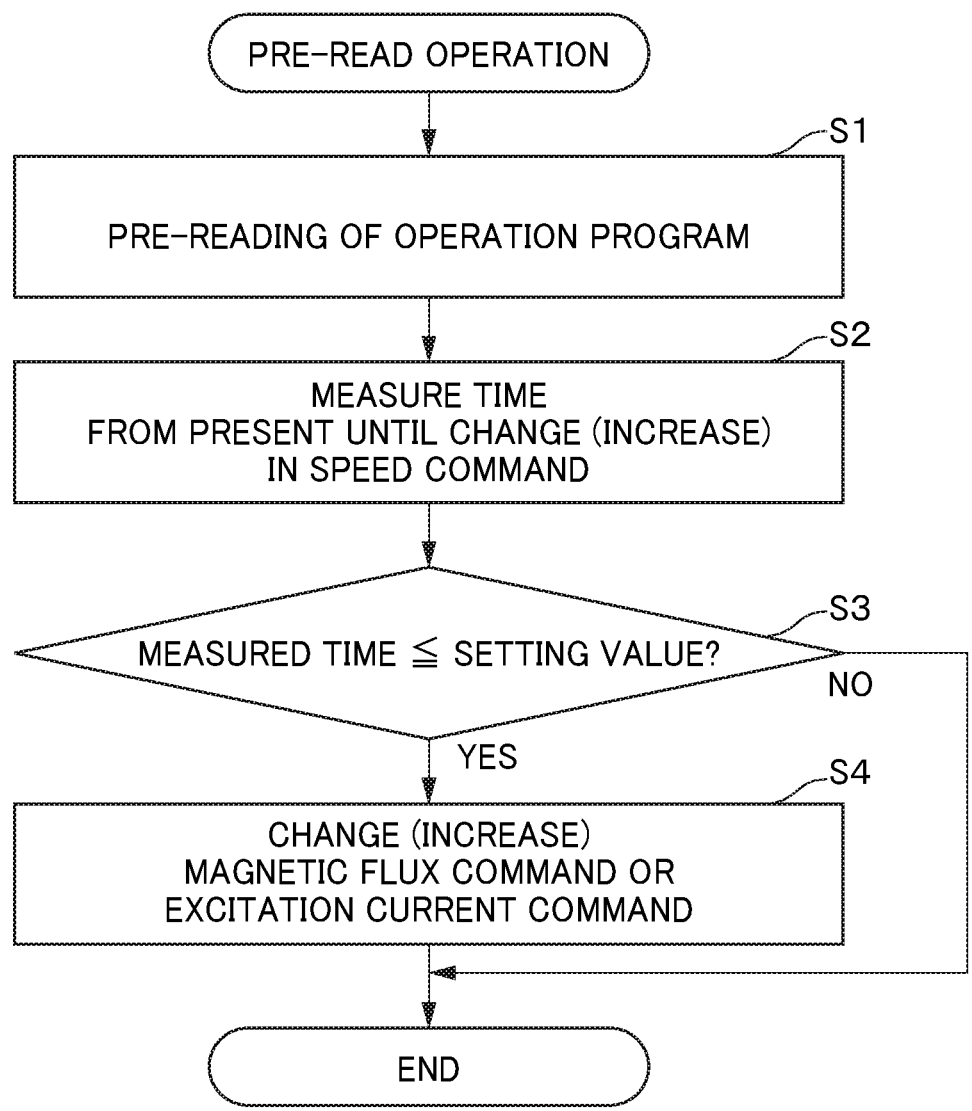

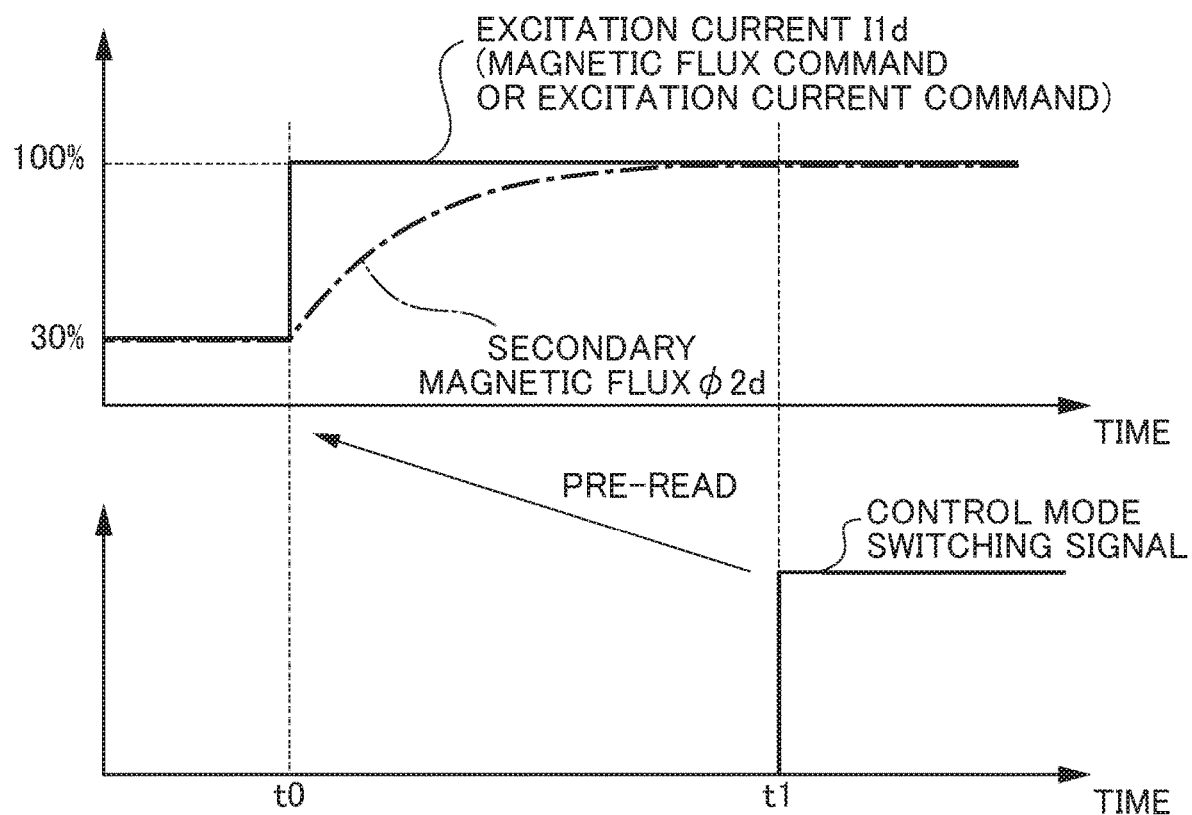

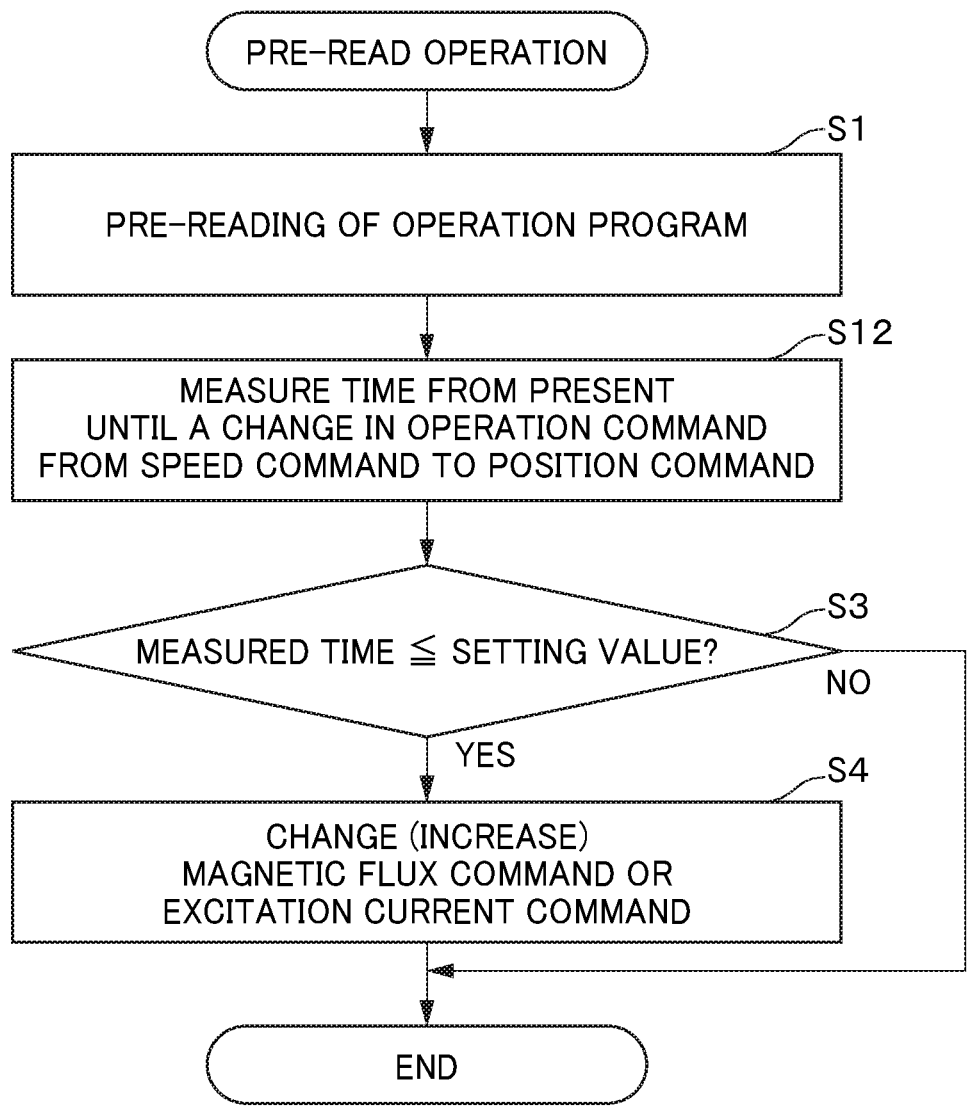

MOTOR CONTROL DEVICE

This application is based on and claims the benefit of priority from Japanese Patent Application No. 2017-202804, filed on 19 Oct. 2017, the content of which is incorporated herein by reference.

BACKGROUND OF THE INVENTION

Field of the Invention

The present invention relates to a motor control device for controlling an induction motor that drives the spindle of a machine tool.

Related Art

Induction motors have been used as the spindle motor of a machine tool. Patent Documents 1 and 2 describe motor control devices that control such induction motors. Patent Document 1 describes technology related to vector control that controls a primary current supplied to the induction motor by dividing into excitation current for magnetic flux generation and torque current. Patent Document 2 describes technology for switching between speed control based on a speed command and position control based on a position command.

Patent Document 1: Japanese Unexamined Patent Application, Publication No. 2013-223329
Patent Document 2: Japanese Unexamined Patent Application, Publication No. 2008-306798

SUMMARY OF THE INVENTION

The induction motor is a motor that causes a rotating magnetic field to be generated by flowing excitation current to the stator coil, as well as causing induction current to generate in the rotor, in which the rotor rotates so as to follow the rotation of the rotating magnetic field by way of this electromagnetic force. In the induction motor, there is a disadvantage in that heating follows due to the excitation current flowing to the stator coil. With the purpose of avoidance of this disadvantage, in the case of the load on the induction motor being light, and high torque not being required, there is a magnetic flux weakening technology which weakens the magnetic flux of the rotating magnetic field or excitation current.

However, during speed control based on the speed command, in the case of performing acceleration/deceleration, high torque becomes necessary. For this reason, in the case of using magnetic flux weakening technology, immediately after increasing the excitation current following the speed command when performing acceleration/deceleration in a state in which torque became low due to weakening the magnetic flux of the induction motor, it is not possible to obtain sufficient torque due to the magnetic flux not sufficiently rising, and the acceleration time extends. In other words, the responsiveness of control declines.

In addition, high responsiveness is demanded also during light load, in position control based on the position command. For this reason, in the case of using magnetic flux weakening technology, when switching from speed control to position control in a state in which torque is low due to weakening the magnetic flux of the induction motor, then immediately after increasing the excitation current following the change from the speed command to the position command, it is not possible to obtain sufficient torque due to the magnetic flux not rising sufficiently, and thus the responsiveness of the position control declines.

The present invention has an object of providing a motor control device that secures both a reduction in heat generation and high responsiveness of control.

(1) A motor control device (for example, the motor control device 1, 1A described later) according to the present invention is a motor control device which controls an induction motor (for example, the induction motor 2 described later) driving a spindle of a machine tool, and includes: a spindle control unit (for example, the spindle control unit 200 described later) that controls a rotational position or rotational speed of the spindle, and a secondary magnetic flux of the induction motor in accordance with an operation command based on an operation program of the machine tool; an advance detection unit (for example, the advance detection unit 10 described later) that pre-reads the operation program, and detects a change in the operation command requiring to increase the secondary magnetic flux of the induction motor in advance; and an advance change unit (for example, the advance change unit 20 described later) that causes the secondary magnetic flux of the induction motor to increase prior to a change in the operation command in the spindle control unit, in a case of a change in the operation command being detected by the advance detection unit.

(2) In the motor control device described in (1), the spindle control unit may perform vector control of the induction motor based on an excitation current command that controls the secondary magnetic flux of the induction motor, and a torque current command that controls the torque of the induction motor, and the advance change unit may cause the secondary magnetic flux of the induction motor to increase by increasing the excitation current command, or the magnetic flux command for generating the excitation current command.

(3) The motor control device described in (1) or (2) may further include: a setting unit (for example, the setting unit 12 described later) that sets, as a setting value, a change timing at which to increase the secondary magnetic flux of induction motor prior to a change of the operation command, in which the advance change unit may cause the secondary magnetic flux of the induction motor to increase based on the setting value set by the setting unit.

(4) In the motor control device described in (3), the advance detection unit may detect a change in the operation command, when the change timing set by the setting unit elapses.

(5) The motor control device described in (3) or (4) may further include: a storage unit (for example, the storage unit 11 described later) that stores a time constant related to a change in the secondary magnetic flux of the induction motor, in which the setting unit may set, as the setting value, the change timing based on the time constant stored in the storage unit.

(6) In the motor control device described in any one of (1) to (5), the change in the operation command may be an increase in speed command for controlling the rotation speed of the spindle, or a change in operation command from the speed command to position control for controlling the rotational position of the spindle.

According to the present invention, it is possible to provide a motor control device that secures both a reduction in heat generation and high responsiveness of control.

BRIEF DESCRIPTION OF THE DRAWINGS

FIG. 6 is a flowchart of a pre-reading operation by the motor control device according to the first embodiment;

FIG. 10 is a schematic drawing of a pre-reading operation by the motor control device according to the second embodiment; and FIG. 11 is a flowchart of the pre-reading operation by the motor control device according to the second embodiment.

DETAILED DESCRIPTION OF THE INVENTION

Hereinafter, examples of embodiments of the present invention will be explained by referencing the attached drawings. It should be noted that the same reference symbols shall be attached to portions which are the same or corresponding in the respective drawings.

First Embodiment

Figure 1A:
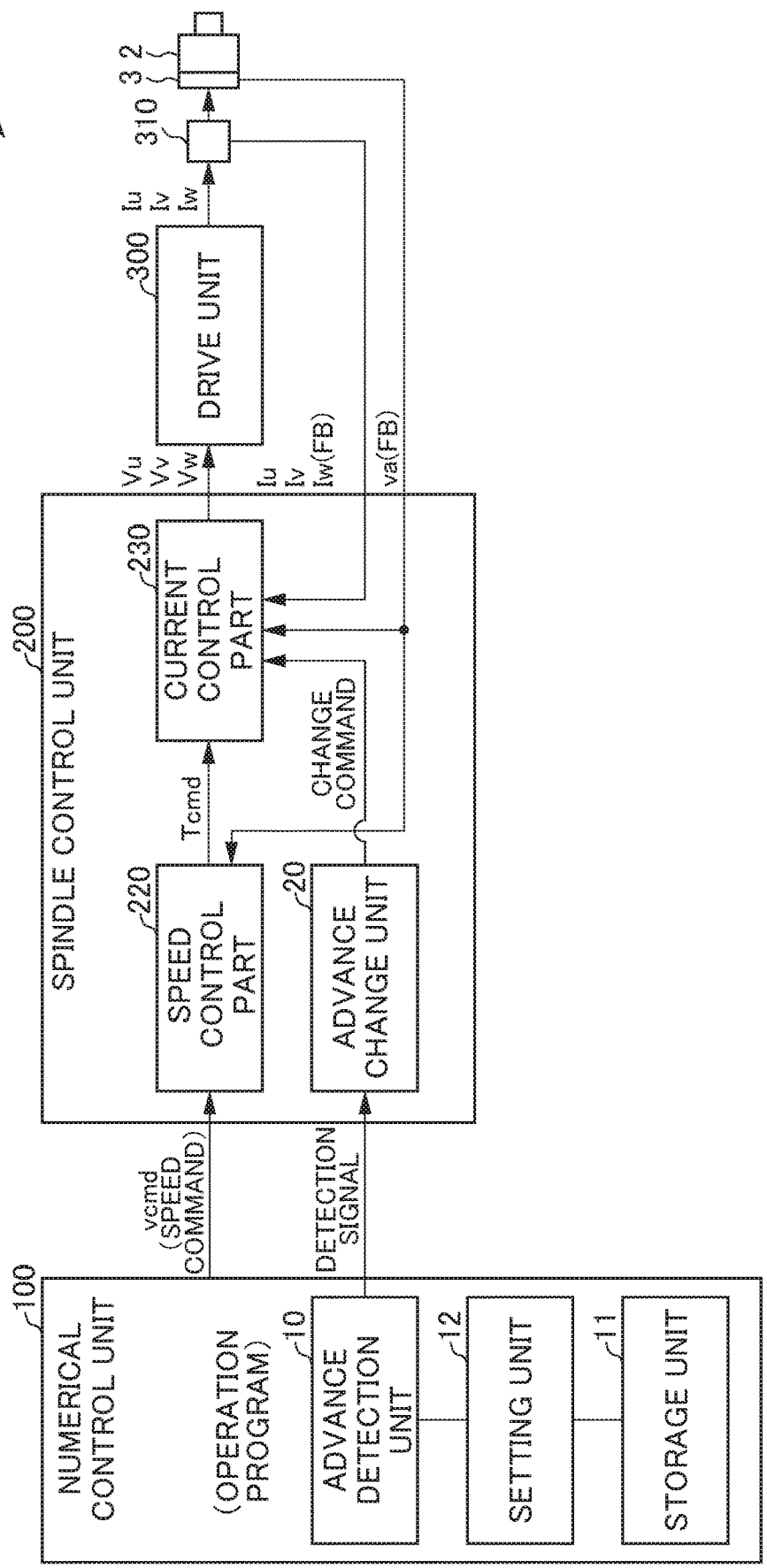
FIG. 1A is a view showing an example of the configuration of a motor control device according to a first embodiment.

FIG. 1A is a view showing an example of the configuration of a motor control device according to the first embodiment. A motor control device 1 according to FIG. 1A is a device for controlling an induction motor 2 which rotationally drives a spindle of a machine tool such as a spindle processing machine. The motor control device 1 includes a numerical control unit (CNC) 100, spindle control unit 200, and drive unit 300.

The numerical control unit 100 stores an operation program (also referred to as machining program) of the machine tool. It should be noted that the numerical control unit 100 may be configured so as to acquire an operation program of the machine tool stored in an external device. The numerical control unit 100 generates a speed command vcmd for controlling the rotational speed of the spindle based on this operation program, and supplies this to the spindle control unit 200.

The spindle control unit 200 controls the induction motor 2 to drive in accordance with the speed command vcmd from the numerical control unit 100. The spindle control unit 200 includes a speed control part 220 and current control part 230.

The speed control part 220 generates a torque command Tcmd based on the difference between the speed command vcmd from the numerical control unit 100, and the actual speed (speed FB) va of the induction motor 2 detected by an encoder 3 provided to the induction motor 2.

The current control part 230 generates voltage commands Vu, Vv, Vw for driving the drive unit 300 based on the torque command Tcmd from the speed control part 220, the actual speed va from the encoder 3, and output current of the drive unit 300 detected by a current detector 310 provided to the drive unit 300, i.e. actual currents (current FB, drive current) Iu, Iv, Iw for driving the induction motor 2.

The numerical control unit 100 and spindle control unit 200, for example, are configured by arithmetic processors such as a DSP (Digital Signal Processor), or FPGA (Field-Programmable Gate Array). The functions of the numerical control unit 100 and spindle control unit 200 are realized by executing predetermined software (programs) stored in a storage unit, for example. The functions of the numerical control unit 100 and spindle control unit 200 may be realized by cooperation between hardware and software, or may be realized by only hardware (electronic circuits).

The drive unit 300 generates the actual current (drive current) Iu, Iv, Iw for driving the induction motor 2, based on the voltage commands Vu, Vv, Vw from the current control part 230. The drive unit 300, for example, is configured by a converter that converts commercial 3-phase AC power into DC power, and an inverter that converts the DC power from the converter into 3-phase AC power. In this case, the voltage command Vu, Vv, Vw is used as the control voltage of the inverter.

Figure 1B:
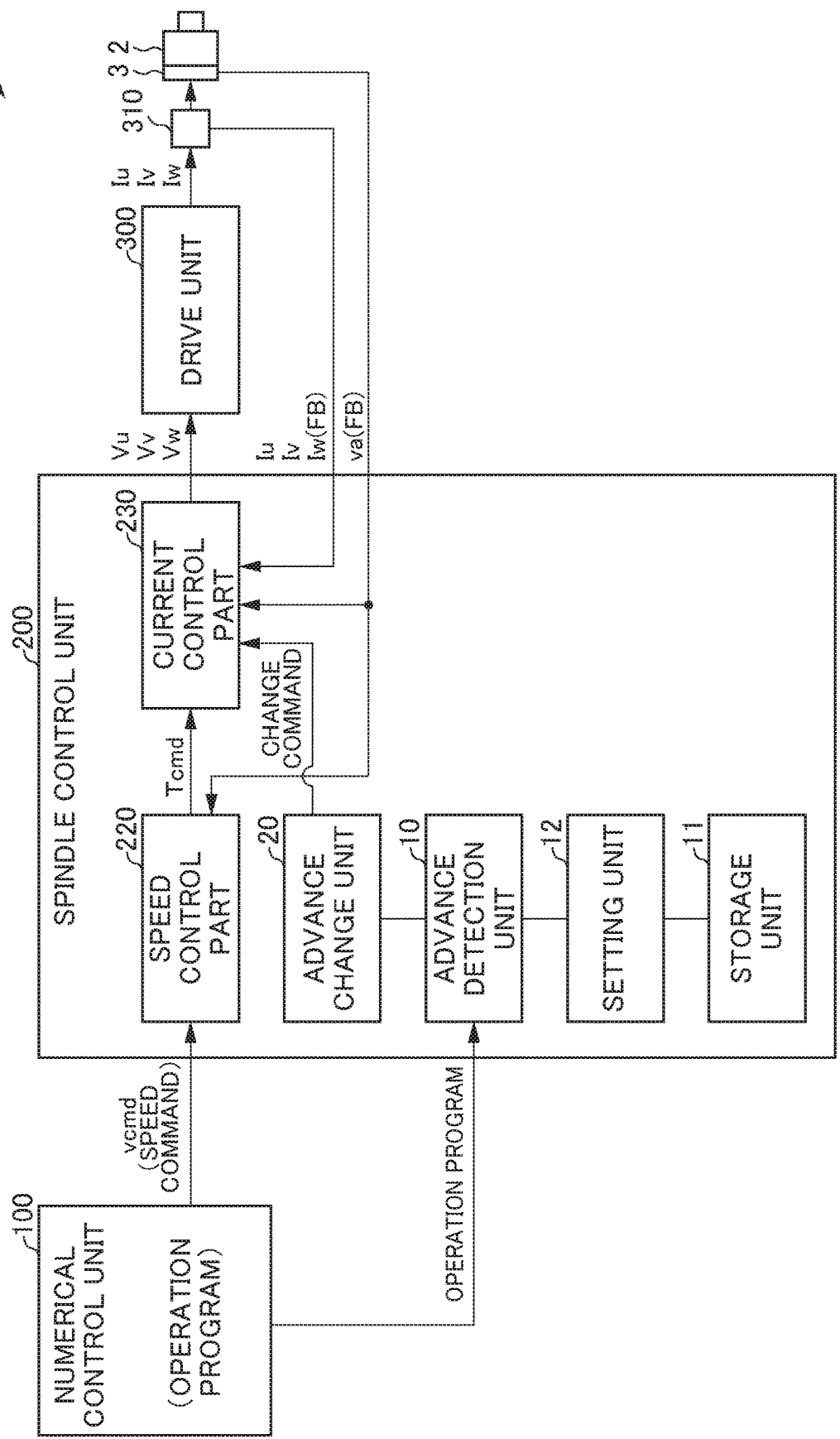
FIG. 1B is a view showing another example of the configuration of a motor control device according to the first embodiment.
Figure 2A:
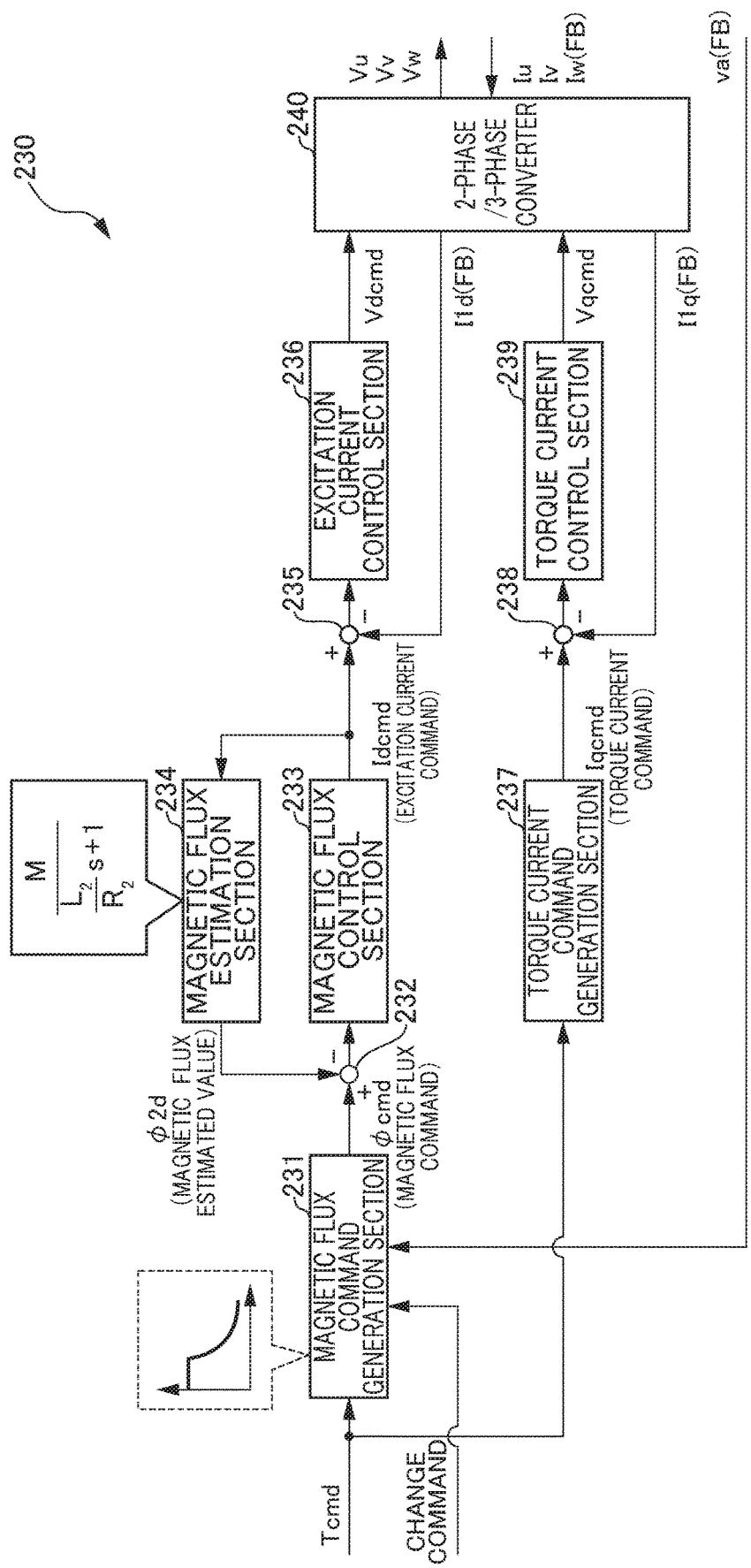
FIG. 2A is a view showing an example of the configuration of a current control part of a spindle control unit shown in FIGS. 1A and 1B.
Figure 2B:
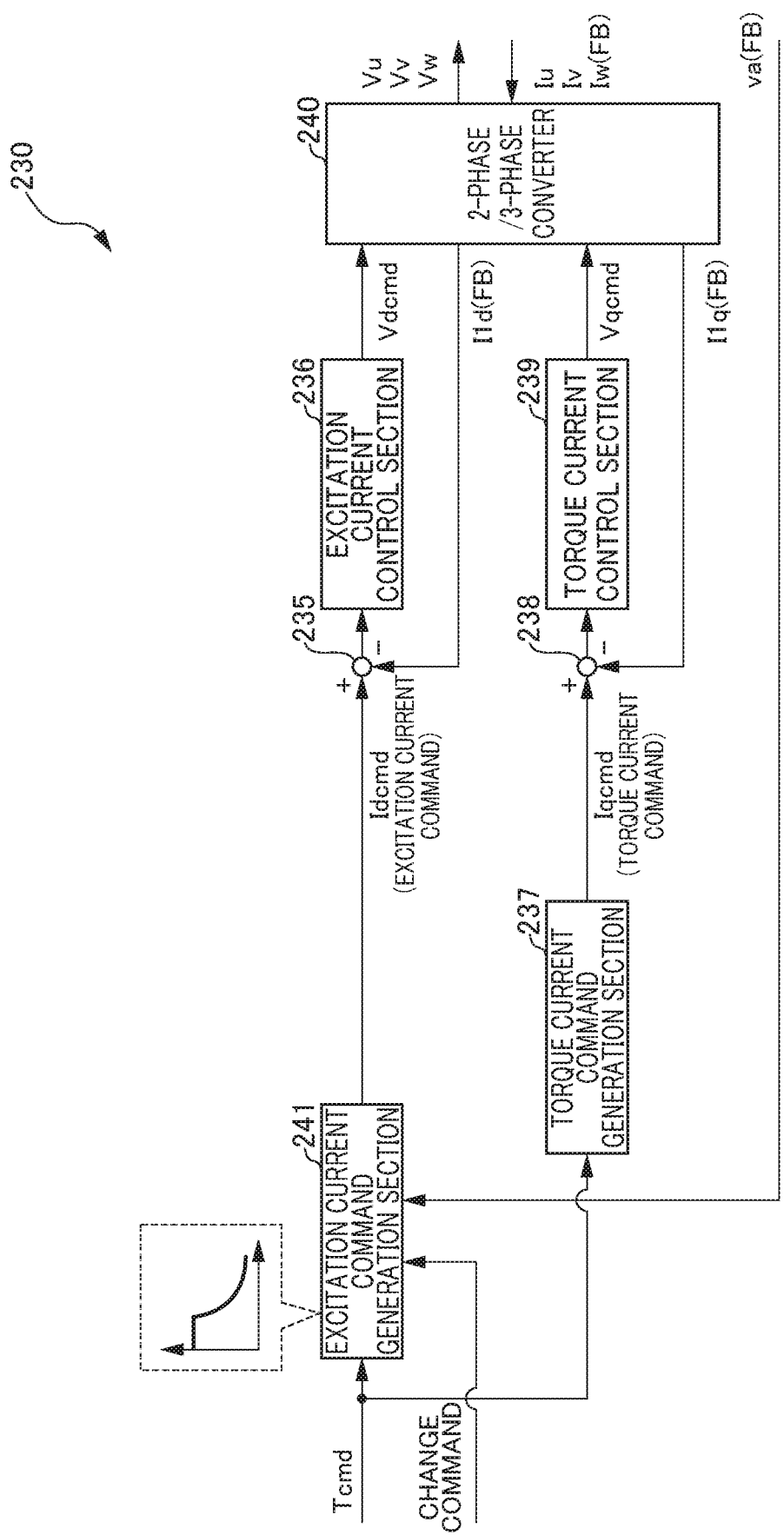
FIG. 2B is a view showing another example of the configuration of a current control part of a spindle control unit shown in FIGS. 1A and 1B.

FIG. 2A is a view showing an example of the configuration of the current control part 230 of the spindle control unit 200 shown in FIG. 1, and FIG. 2B is a view showing another example of the configuration of the current control part 230 of the spindle control unit 200 shown in FIG. 1. The current control part 230 (i.e. spindle control unit 200) shown in FIGS. 2A and 2B performs vector control which controls the primary current of the induction motor 2, i.e. drive current, by dividing into excitation current for magnetic flux generation (d-phase current) and torque current for torque generation (q-phase current).

The current control part 230 shown in FIG. 2A includes a magnetic flux command generation section 231; subtracters 232, 235 and 238; magnetic flux control section 233; magnetic flux estimation section 234; excitation current control section 236; torque current command generation section 237; torque current control section 239; and 2-phase/3-phase converter 240.

The magnetic flux command generation section 231 generates a magnetic flux command Φcmd for magnetic flux generation of the induction motor 2, based on the torque command Tcmd, and actual speed (speed FB) va of the induction motor 2.

The subtracter 232 obtains the difference between the magnetic flux command Φcmd, and an estimated value Φ2d for the secondary magnetic flux of the induction motor 2 estimated by the magnetic flux estimation section 234. The magnetic flux control section 233 generates an excitation current command (d-phase current command) Idcmd based on the difference between the magnetic flux command Φcmd obtained by the subtracter 232 and the magnetic flux estimated value Φ2d. The magnetic flux estimation section 234 estimates the secondary magnetic flux Φ2d of the induction motor 2 according to the following formula (1), based on the excitation current command Idcmd generated by the magnetic flux control section 233, mutual inductance M of the induction motor 2 stored in the storage unit (omitted from illustration), for example, and the time constant τ=$L_2/R_2$ decided by the circuit constant of the induction motor 2.

$$\phi_{2d} = \frac{M}{\frac{L_2}{R_2}s + 1} I_{dcmd} \quad (1)$$

It should be noted that the magnetic flux estimation section 234 may estimate the secondary magnetic flux Φ2d of the induction motor 2 according to the following formula (2), using the feedback I1d of the excitation current (d-phase current) of the induction motor 2 in place of the excitation current command Idcmd.

$$\phi_{2d} = \frac{M}{\frac{L_2}{R_2}s + 1} I_{1d} \quad (2)$$

In this way, the magnetic flux command generation section 231, subtracter 232, magnetic flux control section 233 and magnetic flux estimation section 234 estimate the secondary magnetic flux Φ2d of the induction motor 2 from the excitation current command Idcmd or excitation current I1d by considering the primary delay of the time constant τ=$L_2/R_2$ as in the above formula (1) or above formula (2), and generate the excitation current command Idcmd from the error between the magnetic flux command Φcmd and the magnetic flux estimated value Φ2d.

The subtracter 235 obtains the difference between the excitation current command Idcmd generated by the magnetic flux control section 233, and the feedback I1d of the excitation current (d-phase current) in which the actual currents Iu, Iv, Iw were converted by the 2-phase/3-phase converter 240. The excitation current control section 236 generates the d-phase voltage command Vdcmd based on the difference between the excitation current command Idcmd and the feedback I1d of the excitation current.

The torque current command generation section 237 generates the torque current command (q-phase current command) Iqcmd based on the torque command Tcmd.

The subtracter 238 obtains the difference between the torque current command Iqcmd generated by the torque current command generation section 237 and the feedback I1q of the torque current (q-phase current) in which the actual currents Iu, Iv, Iw were converted by the 2-phase/3-phase converter 240. The torque current control section 239 generates the q-phase voltage command Vqcmd based on the difference between the torque current command Iqcmd and the feedback I1q of the torque current.

The 2-phase/3-phase converter 240 converts the d-phase voltage command Vdcmd and q-phase voltage command Vqcmd to the voltage commands Vu, Vv, Vw of the uvw respective phases. In addition, the 2-phase/3-phase converter 240 converts the actual currents Iu, Iv, Iw of the uvm respective phases to the excitation current (d-phase current) I1d and torque current (q-phase actual current) I1q.

The current control part 230 shown in FIG. 2B includes the excitation current command generation section 241 in place of the magnetic flux command generation section 231, subtracter 232, magnetic flux control section 233 and magnetic flux estimation section 234 of the current control part 230 shown in FIG. 2A. The excitation current command generation section 241 generates the excitation current command (d-phase current command) Idcmd based on the torque command Tcmd and actual speed (speed FB) va of the induction motor 2.

In this way, the current control part 230 shown in FIG. 2B controls the secondary magnetic flux Φ2d of the induction motor 2 indirectly by directly commanding the excitation current by way of the excitation current command generation section 241. Herein, even when the induction motor 2 supplies the excitation current (d-phase current) I1d as shown in the above formula (2), the secondary magnetic flux Φ2d will rise being delayed by the time constant T=$L_2/R_2$. Concerning this point, the current control part 230 shown in FIG. 2A estimates the secondary magnetic flux Φ2d of the induction motor 2 from the excitation current by considering the primary delay of the time constant r=$L_2/R_2$, by the magnetic flux command generation section 231, subtracter 232, magnetic flux control section 233 and magnetic flux estimation section 234, and generates the excitation current command Idcmd from the error between the magnetic flux command Φcmd and magnetic flux estimated value Φ2d. The current control part 230 in FIG. 2A can thereby improve the controllability of the induction motor 2 in a transient state during excitation current change more than the current control part 230 in FIG. 2B.

Figure 3:
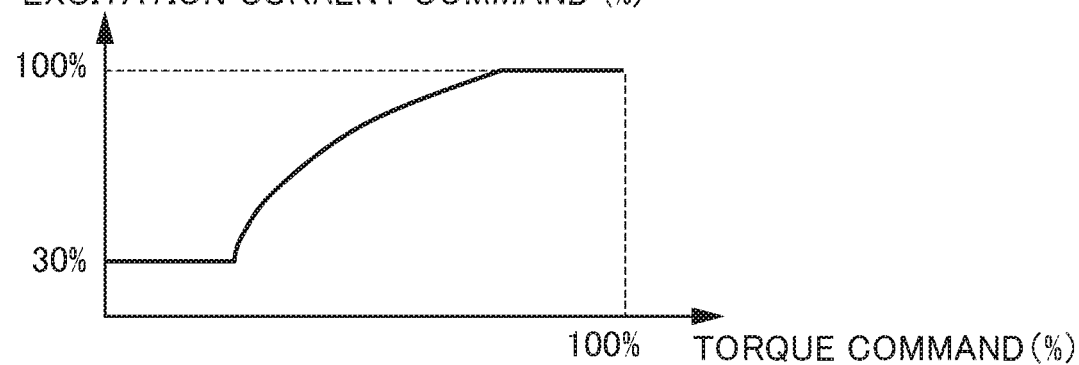
FIG. 3 is a schematic drawing of magnetic flux weakening control of an induction motor.

However, the motor control device 1 controls (magnetic flux weakening control) the secondary magnetic flux (excitation current) of the induction motor 2 to be small, in the case of the load of the induction motor 2 being light and high torque not being required for a heating reduction of the induction motor 2 (during light load). For example, the current control part 230 shown in FIG. 2A changes the magnetic flux command according to the torque command, so as to make the magnetic flux command gradually smaller as the torque command becomes smaller as shown in FIG. 3, by the magnetic flux command generation section 231. In addition, the current control part 230 shown in FIG. 2B changes the magnetic flux command according to the torque command so as to make the excitation current command gradually smaller as the torque command becomes smaller, as shown in FIG. 3, by the excitation current command generation section 241.

Figure 4:
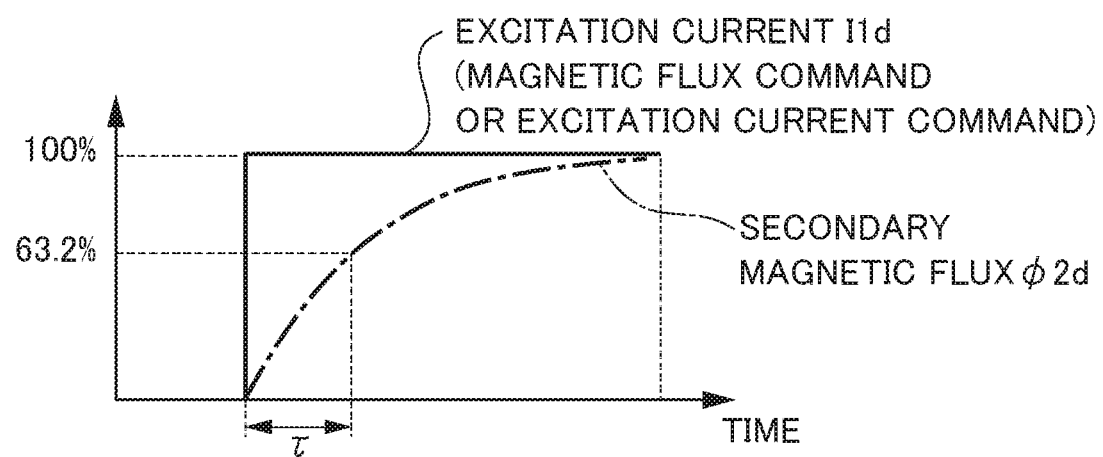
FIG. 4 is a schematic drawing of excitation current and second magnetic flux of the induction motor during a change (increase) in speed command.

For example, if performing accelerating operation from a stopped state when setting the magnetic flux command or excitation current command to 30% according to magnetic flux weakening control, since the torque command changes from 0% to 100%, the magnetic flux command or excitation current command changes from 30% to 100%. At this time, the actual secondary magnetic flux Φ2d rises to be delayed by the time constant T=$L_2/R_2$ relative to the excitation current I1d, i.e. magnetic flux command or excitation current command, as shown in FIG. 4.

The torque T of the induction motor 2 is represented by the product of the secondary magnetic flux Φ2d and torque current (q-phase current) I1q, as shown in the following formula (3).

$$T = 3N_p \frac{M}{L_2} \phi_{2d} I_{1q} \quad (3)$$

Np: Number of Pole Pairs

For this reason, in the case of a large torque such as during acceleration being necessary, i.e. case of the speed command increasing, immediately after increasing the magnetic flux command or excitation current command, it is not possible to output sufficient torque due to the secondary magnetic flux Φ2d not sufficiently rising, and thus it is necessary wait for the rise in magnetic flux. In the case of accelerating without waiting for the rise in magnetic flux, the acceleration time will extend.

Figure 5:
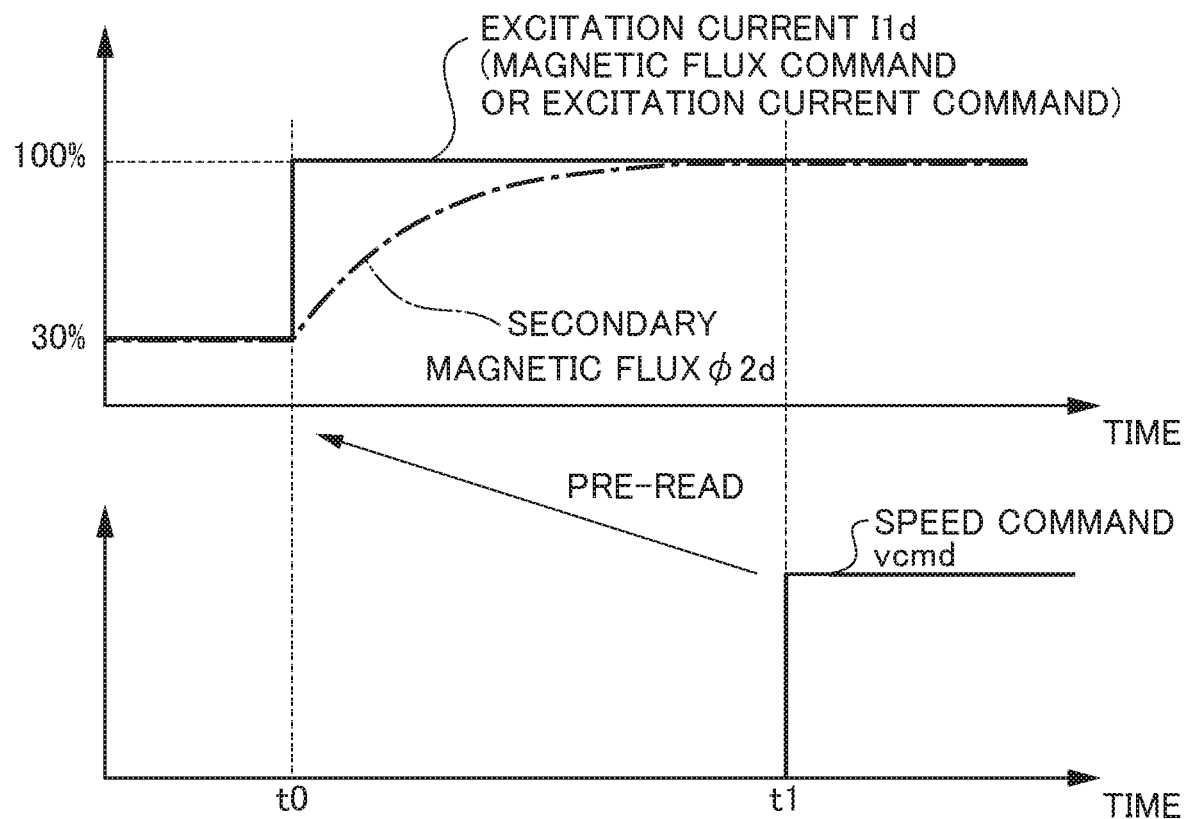
FIG. 5 is a schematic drawing of a pre-reading operation by the motor control device according to the first embodiment.

Therefore, in the present embodiment, the operation program is pre-read and the change (increase) in speed command is detected in advance, and causes the magnetic flux command or excitation current command to increase at time t0, which is a predetermined time earlier than time t1, so that the secondary magnetic flux sufficiently rises by time t1 at which the speed command changes (increases), as shown in FIG. 5.

More specifically, as shown in FIG. 1A, the numerical control unit 100 includes an advance detection unit 10, storage unit 11 and setting unit 12, and the spindle control unit 200 includes the advance change unit 20.

The storage unit 11 stores a time constant related to a change in secondary magnetic flux Φ2d of the induction motor 2 such as that shown in FIGS. 4 and 5, i.e. time constant $\tau = L_2/R_2$ decided by a circuit constant of the induction motor 2 as shown in the above formula (2). The storage unit 11 is rewritable memory such as EEPROM, for example.

The setting unit 12 sets the change timing at which causing the secondary magnetic flux Φ2d of the induction motor 2 to increase prior to the change in speed command vcmd as a setting value. The setting unit 12 sets the change timing at which to cause the magnetic flux command or excitation current command to increase, so that the secondary magnetic flux Φ2d sufficiently rises before the time t1 at which the speed command vcmd changes (increases), as shown in FIG. 5. In the present embodiment, the setting unit 12 sets the predetermined time (t1−t0) as a setting value, in order to increase the magnetic flux command or excitation current command at the time t0, which is a predetermined time earlier than the time t1. For example, the setting unit 12 may set the setting value (t1−t0) to a time that is at least 3-times the time constant t, based on the time constant $\tau = L_2/R_2$ of the induction motor 2 stored in the storage unit 11. It is thereby possible for the secondary magnetic flux of the induction motor 2 to rise up to at least 90% before time t1 at which the speed command vcmd changes (increases) (during change of excitation current from 0% to 100%). The setting unit 12 preferably sets the setting value (t1−t0) to a time 4-times to 7-times the time constant T. When setting the setting value (t1−t0) to a time of at least 4-times the time constant t, it is possible for the secondary magnetic flux Φ2d of the induction motor 2 to rise to at least 98% (during change of excitation current from 0% to 100%) by the time t1 at which the speed command vcmd changes (increases). In addition, when setting the setting value (t1−t0) to a time on the order of 7-times of the time constant t, it is possible for the secondary magnetic flux Φ2d of the induction motor 2 to rise up to about 100% by time t1 (during change of excitation current from 0% to 100%). It should be noted that the setting unit 12 may set the setting value (t1−t0) to a fixed value irrespective of the induction motor used.

The advance detection unit 10 pre-reads the operation program, and detects a change (increase) in speed command, i.e. change in operation command requiring to increase the secondary magnetic flux of the induction motor 2, in advance. In the present embodiment, the advance detection unit 10 detects the change (increase) of a speed command in which the time from current until a change (increase) in speed command, is no more than a setting value set by the setting unit 12. In other words, the advance detection unit 10 detects a change (increase) in speed command, when the change timing set by the setting unit 12 elapses. The advance detection unit 10 sends the detection signal indicating the detection result to the advance change unit 20.

The advance change unit 20 causes the secondary magnetic flux of the induction motor 2 to increase, by increasing the magnetic flux command or excitation current command prior to the change (increase) of speed command, in a case of the change (increase) in speed command was detected by the advance detection unit 10, based on the detection result indicated by the detection signal. For example, the advance change unit 20 performs a change command in the excitation command generation section 231 of the current control part 230, as shown in FIGS. 1A and 2A. The magnetic flux command generation section 231 thereby increases the magnetic flux command prior to the change (increase) of speed command, as shown in FIG. 5. In addition, the advance change unit 20 performs a change command in the excitation current command generation section 241 of the current control part 230, as shown in FIGS. 1A and 2B. The excitation current command generation section 241 thereby increases the excitation current command prior to the change (increase) of speed command, as shown in FIG. 5.

It should be noted that, in the present embodiment, the spindle control unit 200 may include the advance detection unit 10, setting unit 12 and storage unit 11, as shown in FIG. 1B.

Next, a pre-reading operation by the motor control device 1 according to the first embodiment will be explained by referencing FIG. 6.

First, the advance detection unit 10 pre-reads the operation program (S1), measures the time from present until a change (increase) in the speed command (S2), and determines whether the measured time is no more than the setting value that was set by the setting unit 12 (S3).

In the case of the measured time being no more than the setting value, i.e. case of the advance detection unit 10 detecting a change (increase) in speed command in advance, the advance change unit 20 causes the magnetic flux command or excitation current command to increase, thereby increasing the secondary magnetic flux of the induction motor 2 (S4).

On the other hand, in the case of the measured time being longer than the setting value, i.e. case of the advance detection unit 10 detecting a change (increase) in speed command but being early, or a case of the advance detection unit 10 not detecting a change (increase) in speed command, the pre-reading operation is ended.

The motor control device 1 repeats the operations of the aforementioned Steps S1 to S4 in a time interval sufficiently shorter than the setting value that was set by the setting unit 12, for example.

As explained above, according to the motor control device 1 of the first embodiment, the operation program is pre-read, a change (increase) in the speed command is detected in advance, and prior to the change (increase) in speed command, the magnetic flux command or excitation current command is made to increase, thereby increasing the secondary magnetic flux of the induction motor 2. Even if performing magnetic flux weakening control during light load of the induction motor 2 for a reduction in the heat generation of the induction motor, it is thereby possible to sufficiently raise the secondary magnetic flux of the induction motor 2 during change (increase) in speed command, obtaining sufficient torque, and thus possible to shorten the acceleration time. In this way, according to the motor control device 1 of the first embodiment, it is possible to secure both a reduction in heat generation of the induction motor 2 by magnetic flux weakening control during light load of the induction motor 2, and shortening of the acceleration time of the induction motor 2 during a change (increase) in speed command, i.e. high responsiveness in control.

Second Embodiment

In the first embodiment, a motor control device which performs the acceleration operation in the speed control based on the speed command was explained. In the second embodiment, a motor control device that performs control mode switching between speed control based on a speed command and position control based on a position command will be explained.

Figure 7A:
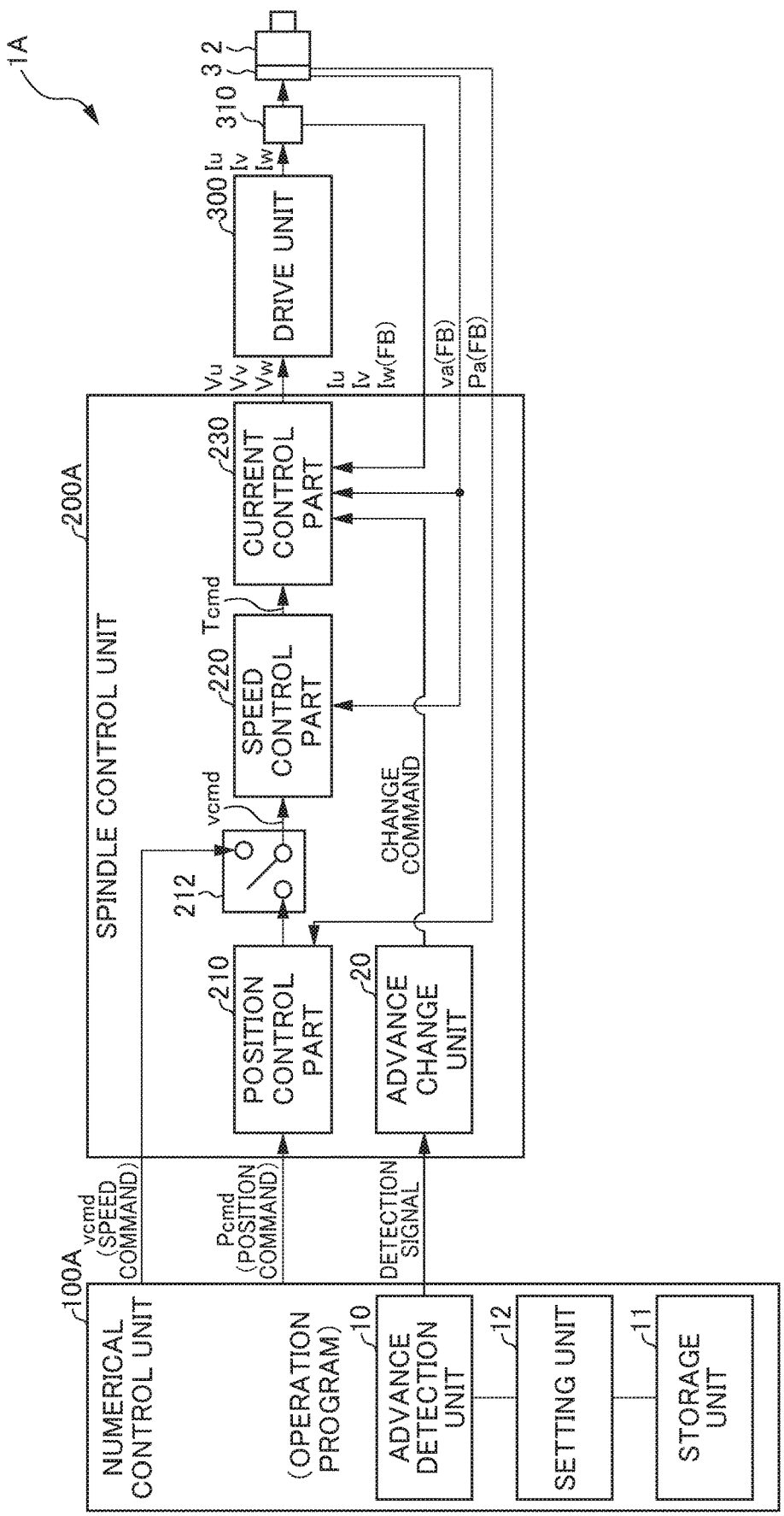
FIG. 7A is a view showing an example of the configuration of a motor control device according to a second embodiment.

FIG. 7A is a view showing an example of the configuration of a motor control device according to the second embodiment. The motor control device 1A shown in FIG. 7A includes a numerical control unit 100A and spindle control unit 200A in place of the numerical control unit 100 and spindle control unit 200 of the motor control device 1 shown in FIG. 1A.

Based on the operation program (machining program), the numerical control unit 100A performs switching of the control mode between a speed control mode based on a speed command, and a position control mode based on a position command. During the speed control mode, the numerical control unit 100A generates a speed command vcmd for controlling the rotating speed of the spindle, and supplies this to the spindle control unit 200A. In addition, during the position control mode, the numerical control unit 100A generates a position command Pcmd for controlling the rotational position of the spindle, and supplies this to the spindle control unit 200A.

The spindle control unit 200A controls the induction motor 2 to drive in accordance with the speed command vcmd from the numerical control unit 100A, during the speed control mode. In addition, the spindle control unit 200A controls the induction motor 2 to drive in accordance with the position command Pcmd from the numerical control unit 100A, during the position control mode. The spindle control unit 200A further includes a position control part 210 and control switching part 212 relative to the spindle control unit 200 shown in FIG. 1A.

The position control part 210 generates the speed command vcmd based on the difference between the position command Pcmd from the numerical control unit 100A, and the feedback Pa for the position (rotational position) of the induction motor 2 detected by the encoder 3 provided to the induction motor 2.

The control switching part 212 switches between the speed command vcmd from the position control part 210 and the speed command vcmd from the numerical control unit 100A, based on the control mode switching signal from the numerical control unit 100A, for example. More specifically, the control switching part 212 supplies the speed command vcmd from the numerical control unit 100A to the speed control part 220 during the speed control mode. In addition, the control switching part 212 supplies the speed command vcmd from the position control part 210 to the speed control part 220 during the position control mode.

Figure 8:
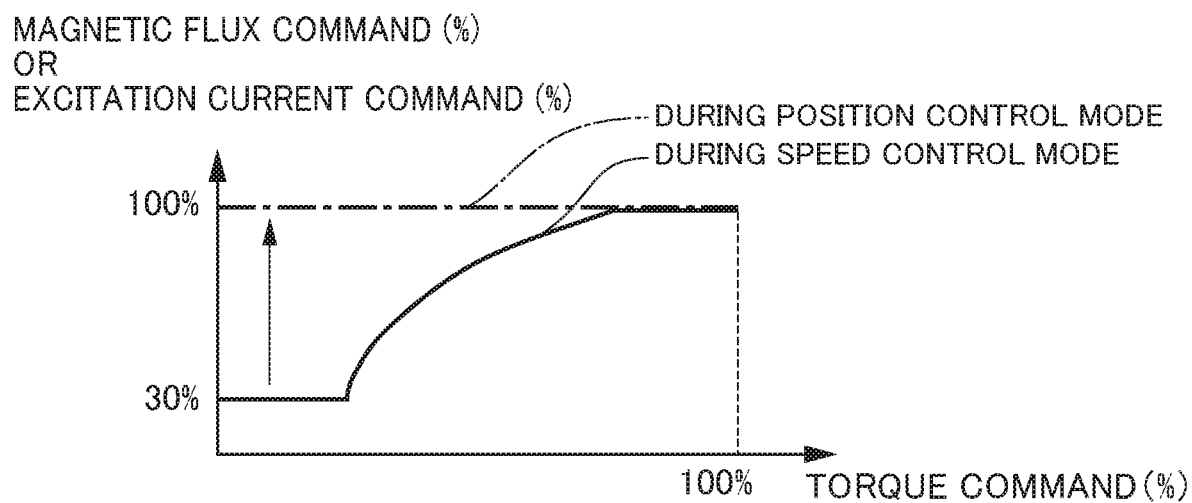
FIG. 8 is a schematic drawing showing magnetic flux weakening control of the induction motor during speed control and magnetic flux control of an induction motor during position control.

As mentioned above, during the speed control based on the speed command, the motor control device 1 controls the secondary magnetic flux (excitation current) of the induction motor 2 to be small (magnetic flux weakening control), in the case of the load of the induction motor 2 being light and high torque not being required (during light load) for a heat generation reduction of the induction motor 2. On the other hand, the magnetic flux command or excitation current command during light load is set to be large in order for high responsiveness to be obtained also during light load in the position control based on the position command. For example, with the current control part 230 shown in FIG. 2A, the magnetic flux command is always set to 100% irrespective of the torque command as shown in FIG. 8, by the magnetic flux command generation section 231. In addition, with the current control part 230 shown in FIG. 2B, the excitation current command is always set to 100% irrespective of the torque command as shown in FIG. 8, by the excitation current command generation section 241.

For example, if switching from the speed control mode to position control mode when setting the magnetic flux command or excitation current command to 30% according to the magnetic flux weakening control in the speed control mode in the stopped state (during light load), the magnetic flux command or excitation current command changes from 30% to 100%. At this time, the actual secondary magnetic flux $\Phi 2d$ rises to be delayed by the time constant $\tau = L_2/R_2$ relative to the excitation current $I1d$, i.e. magnetic flux command or excitation current command, as shown in FIG. 4.

Figure 9A:
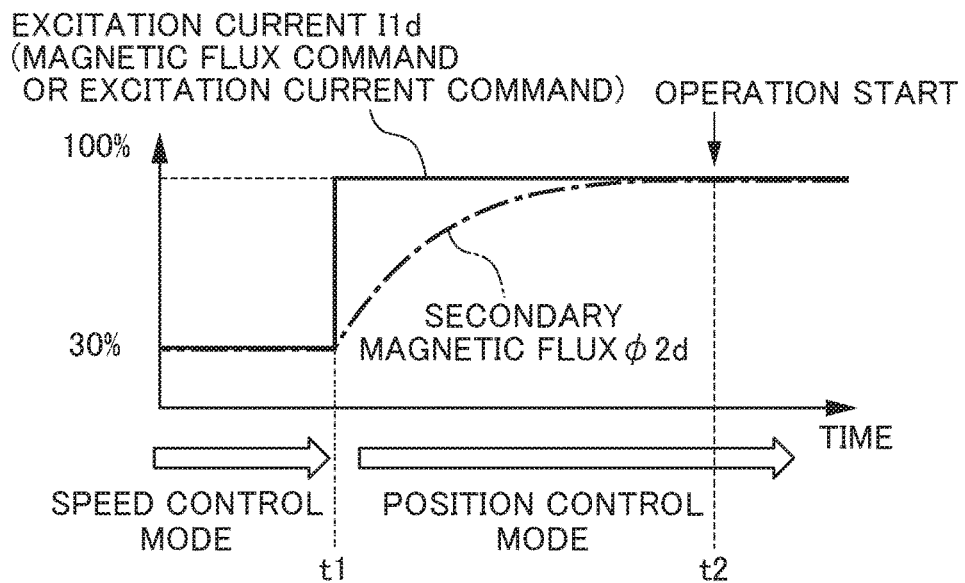
FIG. 9A is a schematic drawing showing excitation current and secondary magnetic flux of the induction motor during change from speed control to position control.

As mentioned above, the torque T of the induction motor 2 is represented by the product of secondary magnetic flux $\Phi 2d$ and torque current (q-phase current) $I1q$ as shown in the above formula (3). For this reason, in the case of the control mode changing from the speed control mode to the position control mode as shown in FIG. 9A, immediately after increasing the magnetic flux command or excitation current command (immediately after time t1), it is not possible to output sufficient torque due to the secondary magnetic flux $\Phi 2d$ not rising sufficiently, and the responsiveness of position control declines. For this reason, during control mode switching, it was necessary to wait until the secondary magnetic flux sufficiently rises, and then start operation (time t2). If this waiting time occurs every time during control mode switching, the machining time lengthens.

Figure 9B:
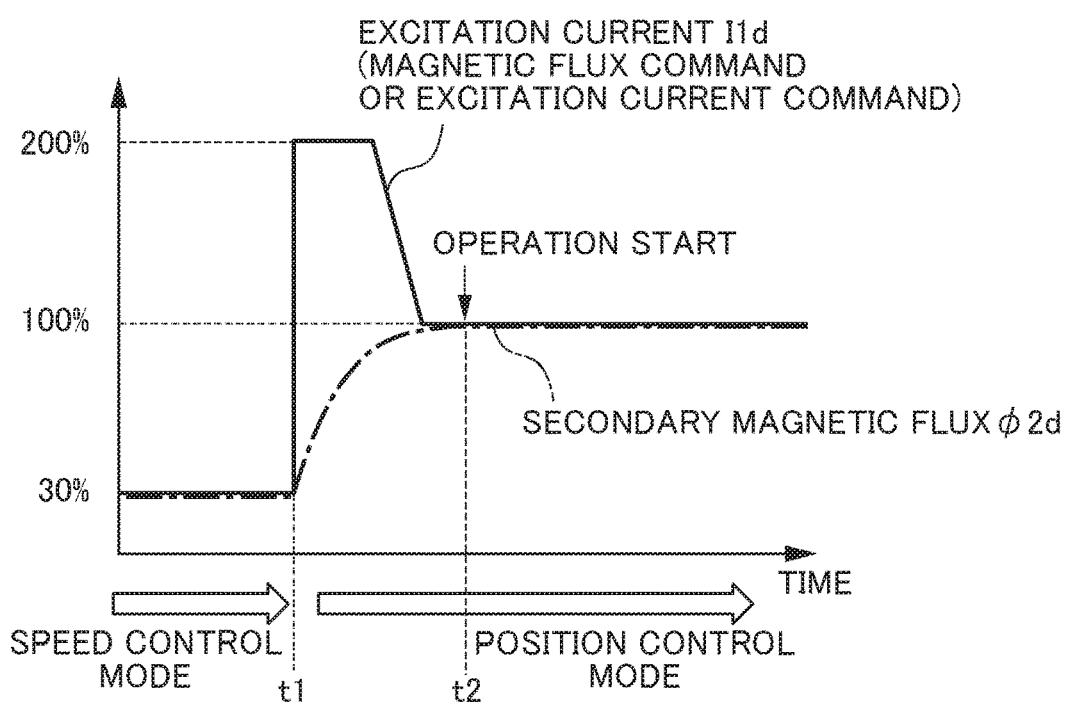
FIG. 9B is a schematic drawing of magnetic flux boost control of the induction motor.

In relation to this point, there is technology which hastens the rise of secondary magnetic flux by increasing the magnetic flux command or excitation current command during control mode switching to at least 100% (magnetic flux amplification, magnetic flux boost) (refer to Patent Document 2). For example, the current control part 230 shown in FIG. 2A amplifies the magnetic flux command to 200, for example, for a predetermined time (time t1), when switching from the speed control mode of 30% magnetic flux command to the position control mode of 100% magnetic flux command, as shown in FIG. 9B, by way of the magnetic flux command generation section 231. In addition, the current control part 230 shown in FIG. 2B amplifies the excitation current command to 200%, for example, for a predetermined time (time t1), when switching from the speed control mode of 30% excitation current command to the position control mode of 100% excitation current command, as shown in FIG. 9B, by way of the excitation current command generation section 241. It is thereby possible to hasten the rise of secondary magnetic flux, and thus expedite the operation start of position control (time t2). However, there is a problem in that the torque variation occurring by quickly changing the excitation current becomes greater than the static friction force, and the induction motor 2 moves during excitation current amplification.

Therefore, also with the present embodiment, a change in the operation command from the speed command to position command (control mode switching signal) is detected in advance by pre-reading the operation program, and the magnetic flux command or excitation current command are made to increase at time t0, which is a predetermined time earlier than time t1, so that the secondary magnetic flux sufficiently rises before time t1 at which the operation command changes from speed command to position command.

More specifically, the numerical control unit 100A includes the advance detection unit 10, storage unit 11 and setting unit 12, similarly to the numerical control unit 100 shown in FIG. 1A. In addition, the spindle control unit 200A includes the advance change unit 20 similarly to the spindle control unit 200 shown in FIG. 1A.

The advance detection unit 10 pre-reads the operation program, and detects a change in the operation command from speed command to position command, i.e. change in operation command which requires increasing the secondary magnetic flux of the induction motor 2, in advance. In the present embodiment, the advance detection unit 10 detects a change in the operation command in which the time from present until a change in operation command is no more than the setting value that was set by the setting unit 12. In other words, when the change timing set by the setting unit 12 elapses, the advance detection unit 10 detects a change in the operation command from speed command to position command. The advance detection unit 10 sends the detection signal indicating the detection result to the advance change unit 20.

The advance change unit 20 causes the secondary magnetic flux of the induction motor 2 to increase, by increasing the magnetic flux command or excitation current command prior to the change in operation command from speed command to position command, in the case of the change in operation command from speed command to position command being detected in advance by the advance detection unit 10, based on the detection result indicated by the detection signal. For example, the advance change unit 20 performs a change command to the magnetic flux command generation section 231 of the current control part 230, as shown in FIGS. 7A and 2A. The magnetic flux command generation section 231 thereby increases the magnetic flux command prior to the change in operation command from speed command to position command, as shown in FIG. 10. In addition, the advance change unit 20 performs a change command on the excitation current command generation section 241 of the current control part 230, as shown in FIGS. 7A and 2B. The excitation current command generation section 241 thereby increases the excitation current command prior to the change in operation command from speed command to position command, as shown in FIG. 10.

Figure 7B:
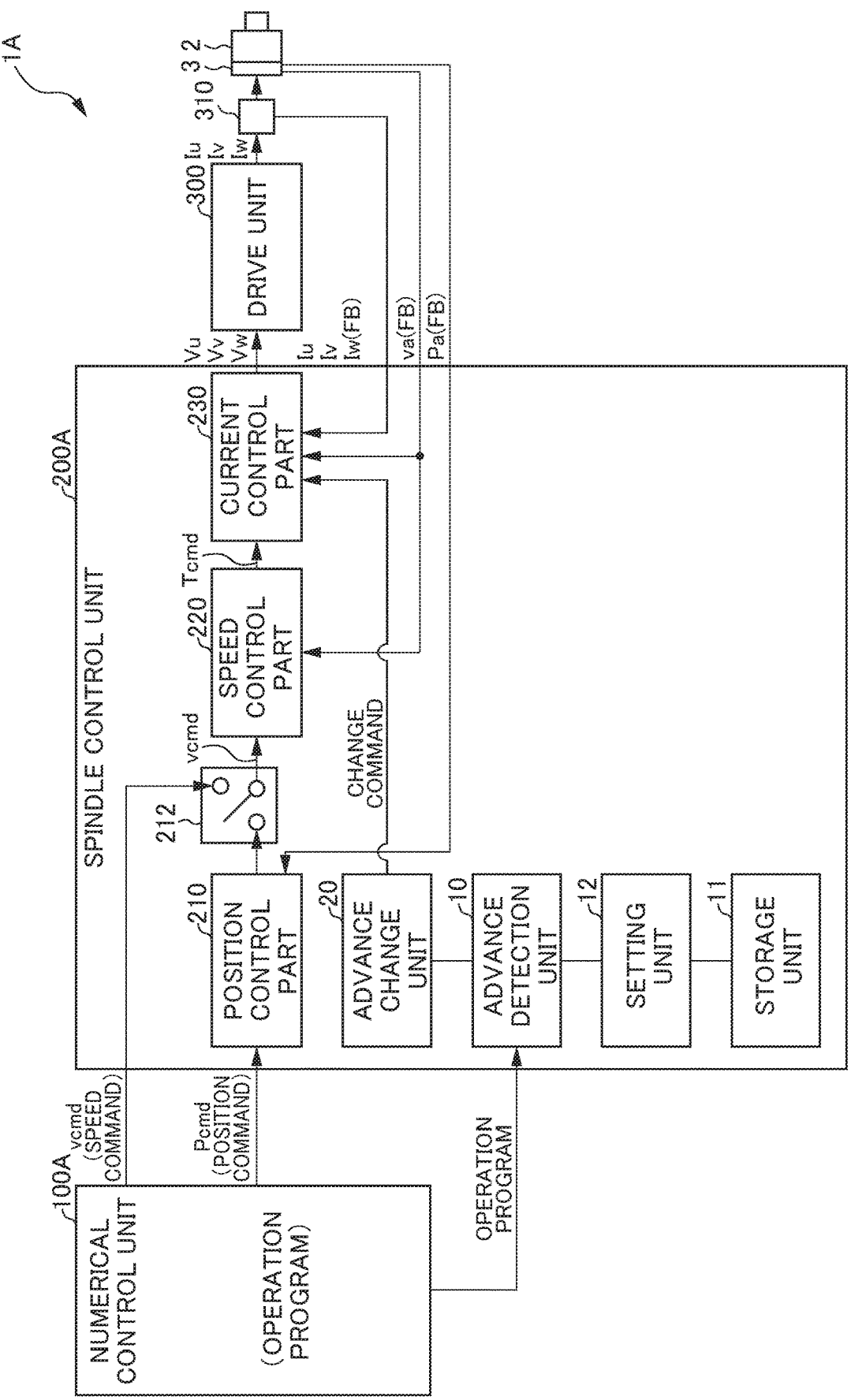
FIG. 7B is a view showing another example of the configuration of a motor control device according to a second embodiment.

It should be noted that, also in the present embodiment, the spindle control unit 200A may include the advance detection unit 10, storage unit 11 and setting unit 12, as shown in FIG. 7B.

Next, the pre-reading operation by the motor control device 1A according to the second embodiment will be explained by referencing FIG. 11.

First, the advance detection unit 10 pre-reads the operation program (S1), measures the time from present until a change in the operation command from speed command to position command (S12), and determines whether the measured time is no more than a setting value that was set by the setting unit 12 (S3).

In the case of the measured time being no more than the setting value, i.e. case of the advance detection unit 10 having detected in advance a change in the operation command from speed command to position command, the advance change unit 20 causes the magnetic flux command or excitation current command to increase, thereby increasing the secondary magnetic flux of the induction motor 2 (S4).

On the other hand, in the case of the measured time being longer than the setting value, i.e. case of the advance detection unit 10 detecting a change in operation command from speed command to position command, but still being early, or case of the advance detection unit 10 not detecting a change in operation command from speed command to position command, the pre-reading operation is ended.

The motor control device 1A repeats the operations of the aforementioned Steps S1, S12, S3 and S4 in a time interval sufficiently shorter than the setting value that was set by the setting unit 12, for example.

As explained above, according to the motor control device 1A of the second embodiment, the operation program is pre-read and a change in the operation command from speed command to position command is detected in advance, and the magnetic flux command or excitation current command is made to increase prior to the change from speed command to position command, thereby increasing the secondary magnetic flux of the induction motor 2. Even in a case of performing magnetic flux weakening control during light load of the induction motor 2 for a reduction in the heat generation of the induction motor, during speed control, it is thereby possible to sufficiently raise the secondary magnetic flux of the induction motor 2 during control mode switching from speed control to position control, obtaining sufficient torque, and thus possible to shorten the acceleration time. In this way, according to the motor control device 1A of the second embodiment, it is possible to secure both a reduction in heat generation of the induction motor 2 by magnetic flux weakening control during light load of the induction motor 2, and high responsiveness in position control of the induction motor 2 during a change in operation command from speed command to position command.

In addition, according to the motor control device 1A of the second embodiment, since there is no requirement to use magnetic flux amplification (magnetic flux boost) technology, the induction motor 2 will not move during a change in operation command from speed command to position command.

Although embodiments of the present invention have been explained above, the present invention is not to be limited to the aforementioned embodiments, and various changes and modifications thereto are possible.

EXPLANATION OF REFERENCE NUMERALS 1, 1A motor control device
2 induction motor
3 encoder 10 advance detection unit
11 storage unit
12 setting unit
20 advance change unit
100, 100A numerical control unit
200, 200A spindle control unit
210 position control part
212 control switching part
220 speed control part
230 current control part
231 magnetic flux command generation section
232, 235, 238 subtractor
233 magnetic flux control section
234 magnetic flux estimation section
236 excitation current control section
237 torque current command generation section
239 torque current control section
240 2-phase/3-phase converter
241 excitation current command generation section
300 drive unit
310 current detector

What is claimed is:

1. A motor control device that controls an induction motor driving a spindle of a machine tool, the motor control device comprising:
    a spindle control unit that controls a rotational position or rotational speed of the spindle, and a secondary magnetic flux of the induction motor in accordance with an operation command based on an operation program of the machine tool;
    an advance detection unit that pre-reads the operation program, and detects a change in the operation command requiring to increase the secondary magnetic flux of the induction motor in advance;
    an advance change unit that causes the secondary magnetic flux of the induction motor to increase prior to a change in the operation command in the spindle control unit, in a case of a change in the operation command being detected by the advance detection unit;
    a setting unit that sets, as a setting value, a change timing at which to increase the secondary magnetic flux of induction motor prior to a change of the operation command; and
    a storage unit that stores a time constant related to a change in the secondary magnetic flux of the induction motor,
    wherein the setting unit sets, as the setting value, the change timing based on the time constant stored in the storage unit,
    wherein the setting unit sets the setting value to a time that is at least 3-times the time constant, and
    wherein the advance change unit causes the secondary magnetic flux of the induction motor to increase based on the setting value set by the setting unit.

2. The motor control device according to claim 1, wherein the spindle control unit performs vector control of the induction motor based on an excitation current command that controls the secondary magnetic flux of the induction motor, and a torque current command that controls the torque of the induction motor, and
    wherein the advance change unit causes the secondary magnetic flux of the induction motor to increase by increasing the excitation current command, or the magnetic flux command for generating the excitation current command.

3. The motor control device according to claim 1, wherein the advance detection unit detects a change in the operation command, when the change timing set by the setting unit elapses.

4. The motor control device according to claim 1, wherein the change in the operation command is an increase in speed command for controlling the rotation speed of the spindle, or a change in operation command from the speed command to position control for controlling the rotational position of the spindle.

* * * * *